US010020531B2

(12) United States Patent
Silk et al.

(10) Patent No.: US 10,020,531 B2
(45) Date of Patent: Jul. 10, 2018

(54) BATTERY SYSTEM WITH INTERNAL COOLING PASSAGES

(71) Applicant: ENERDEL, INC., Greenfield, IN (US)

(72) Inventors: Bruce James Silk, Indianapolis, IN (US); Wendell G. Ferguson, Daleville, IN (US)

(73) Assignee: ENERDEL, INC., Greenfield, IN (US)

(\*) Notice: Subject to any disclaimer, the term of this patent is extended or adjusted under 35 U.S.C. 154(b) by 10 days.

(21) Appl. No.: 13/826,982

(22) Filed: Mar. 14, 2013

(65) Prior Publication Data
US 2014/0272494 A1 Sep. 18, 2014

(51) Int. Cl.
| *H01M 2/10* | (2006.01) |
| *H01M 2/02* | (2006.01) |
| *H01M 10/04* | (2006.01) |
| *H01M 10/64* | (2014.01) |
| *H01M 10/647* | (2014.01) |
| *H01M 10/6557* | (2014.01) |
| *H01M 10/613* | (2014.01) |
| *H01M 10/625* | (2014.01) |

(52) U.S. Cl.
CPC ......... *H01M 10/04* (2013.01); *H01M 2/1077* (2013.01); *H01M 10/613* (2015.04); *H01M 10/647* (2015.04); *H01M 10/6557* (2015.04); *H01M 10/625* (2015.04); *Y10T 29/49002* (2015.01); *Y10T 29/49117* (2015.01)

(58) Field of Classification Search
CPC .... H01M 2/10; H01M 10/5061; H01M 10/04; H01M 10/5004; H01M 10/5006
See application file for complete search history.

(56) References Cited

U.S. PATENT DOCUMENTS

| 5,057,384 A | 10/1991 | Bones et al. |
| 5,456,994 A | 10/1995 | Mita |
| 5,756,227 A | 5/1998 | Suzuki |
| 6,709,783 B2 | 3/2004 | Ogata et al. |
| 6,914,414 B2 | 7/2005 | Hamada et al. |
| 7,264,902 B2 | 9/2007 | Horie et al. |
| 7,504,799 B2 | 3/2009 | Hamada et al. |
| 7,541,770 B2 | 6/2009 | Kim et al. |
| 7,618,740 B2 | 11/2009 | Hamada et al. |
| 7,625,665 B2 | 12/2009 | Jeon et al. |
| 7,997,367 B2 | 8/2011 | Nakamura |
| 8,268,472 B2 | 9/2012 | Ronning et al. |

(Continued)

FOREIGN PATENT DOCUMENTS

| JP | 2004362879 A | * 12/2004 | ............. H01M 2/10 |
| JP | 2005349955 | 12/2005 | |

(Continued)

OTHER PUBLICATIONS

Machine Translation of: Takeuchi et al. JP 2004/362879, Dec. 24, 2004.*

(Continued)

*Primary Examiner* — Kenneth J Douyette
(74) *Attorney, Agent, or Firm* — Faegre Baker Daniels LLP

(57) ABSTRACT

A multi-cell battery system is disclosed including a plurality of battery sub-assemblies and a plurality of heat exchange members stacked together along a longitudinal axis. Each of the plurality of heat exchange members defines a heat exchange passageway through the battery system.

27 Claims, 4 Drawing Sheets

(56) References Cited

U.S. PATENT DOCUMENTS

| | | |
|---|---|---|
| 2005/0123828 A1 | 6/2005 | Oogami et al. |
| 2006/0076923 A1* | 4/2006 | Eaves .................... 320/112 |
| 2006/0115720 A1 | 6/2006 | Kim |
| 2006/0183017 A1 | 8/2006 | Kanai |
| 2006/0214641 A1 | 9/2006 | Cho |
| 2008/0164081 A1* | 7/2008 | Watanabe ......... B60H 1/00278 180/68.5 |
| 2009/0325051 A1* | 12/2009 | Niedzwiecki ......... F28F 9/0275 429/120 |
| 2010/0119927 A1 | 5/2010 | Bauer |
| 2010/0266883 A1 | 10/2010 | Koetting et al. |
| 2010/0304203 A1 | 12/2010 | Buck et al. |
| 2011/0042117 A1* | 2/2011 | Doege ................ H01M 2/0275 173/217 |
| 2011/0189524 A1 | 8/2011 | Alizon et al. |
| 2011/0189525 A1 | 8/2011 | Palanchon et al. |
| 2011/0192659 A1 | 8/2011 | Chew et al. |
| 2011/0229749 A1* | 9/2011 | Kim et al. .................... 429/120 |
| 2012/0021271 A1 | 1/2012 | Tople et al. |
| 2012/0040222 A1* | 2/2012 | Quick ................ H01M 10/647 429/120 |
| 2012/0045683 A1* | 2/2012 | Gadawski ......... H01M 10/613 429/120 |
| 2012/0021270 A1 | 6/2012 | Kumar et al. |
| 2012/0231318 A1 | 9/2012 | Buck et al. |
| 2012/0282506 A1 | 11/2012 | Hohenthanner |

FOREIGN PATENT DOCUMENTS

| | | |
|---|---|---|
| JP | 4415570 | 2/2010 |
| JP | 4-457812 | 4/2010 |
| JP | 5-078052 | 11/2012 |
| SU | 1838848 | 8/1993 |
| WO | 2012/167269 | 12/2012 |

OTHER PUBLICATIONS

International Search Report and Written Opinion in PCT/US2014/026084, dated Aug. 7, 2014, 7 pages.

\* cited by examiner

BATTERY SYSTEM WITH INTERNAL COOLING PASSAGES

FIELD OF THE DISCLOSURE

The present disclosure relates to a battery system. More particularly, the present disclosure relates to a cooling system and method for a multi-cell battery system.

BACKGROUND OF THE DISCLOSURE

A plurality of battery cells, such as lithium-ion battery cells, may be stacked together to form a multi-cell battery system. In U.S. Patent Application Publication No. 2012/0021271 to Tople et al., for example, a battery system is disclosed with a stacked arrangement of battery cells and frames.

In operation, such battery systems may generate heat, especially during repeated charging and discharging of the battery system. A cooling system may be provided to remove heat from the battery system. However, the thermal path of the cooling system may be relatively long and indirect.

The present disclosure provides a battery system with a more direct thermal path for improved cooling.

SUMMARY

The present disclosure provides a multi-cell battery system that includes a plurality of battery sub-assemblies and a plurality of heat exchange members stacked together along a longitudinal axis. Each of the plurality of heat exchange members defines a heat exchange passageway through the battery system.

According to an embodiment of the present disclosure, a battery system is provided including a plurality of prismatic battery cells including a first cell having a first terminal extending from the first cell, and a second cell having a second terminal extending from the second cell, and a heat exchange member located between the first and second cells, the heat exchange member including a first planar surface in direct contact with the first cell, a second surface opposite the first surface, and a heat exchange passageway formed between the first and second surfaces.

According to another embodiment of the present disclosure, a battery system is provided including a plurality of prismatic battery cells including a first cell having a first terminal extending from the first cell, and a second cell having a second terminal extending from the second cell, and a heat exchange member located between the first and second cells, the heat exchange member including a first planar surface compressed against the first cell, a second surface opposite the first surface, and a heat exchange passageway formed between the first and second surfaces.

According to yet another embodiment of the present disclosure, a method is provided for assembling a battery system. The battery system includes a longitudinal axis and a plurality of prismatic battery cells including a first cell and a second cell. The method includes the steps of: arranging a heat exchange member between the first and second cells, the heat exchange member including a first planar surface, a second planar surface opposite the first surface, and a heat exchange passageway formed between the first and second surfaces, compressing the heat exchange member between the first and second cells.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
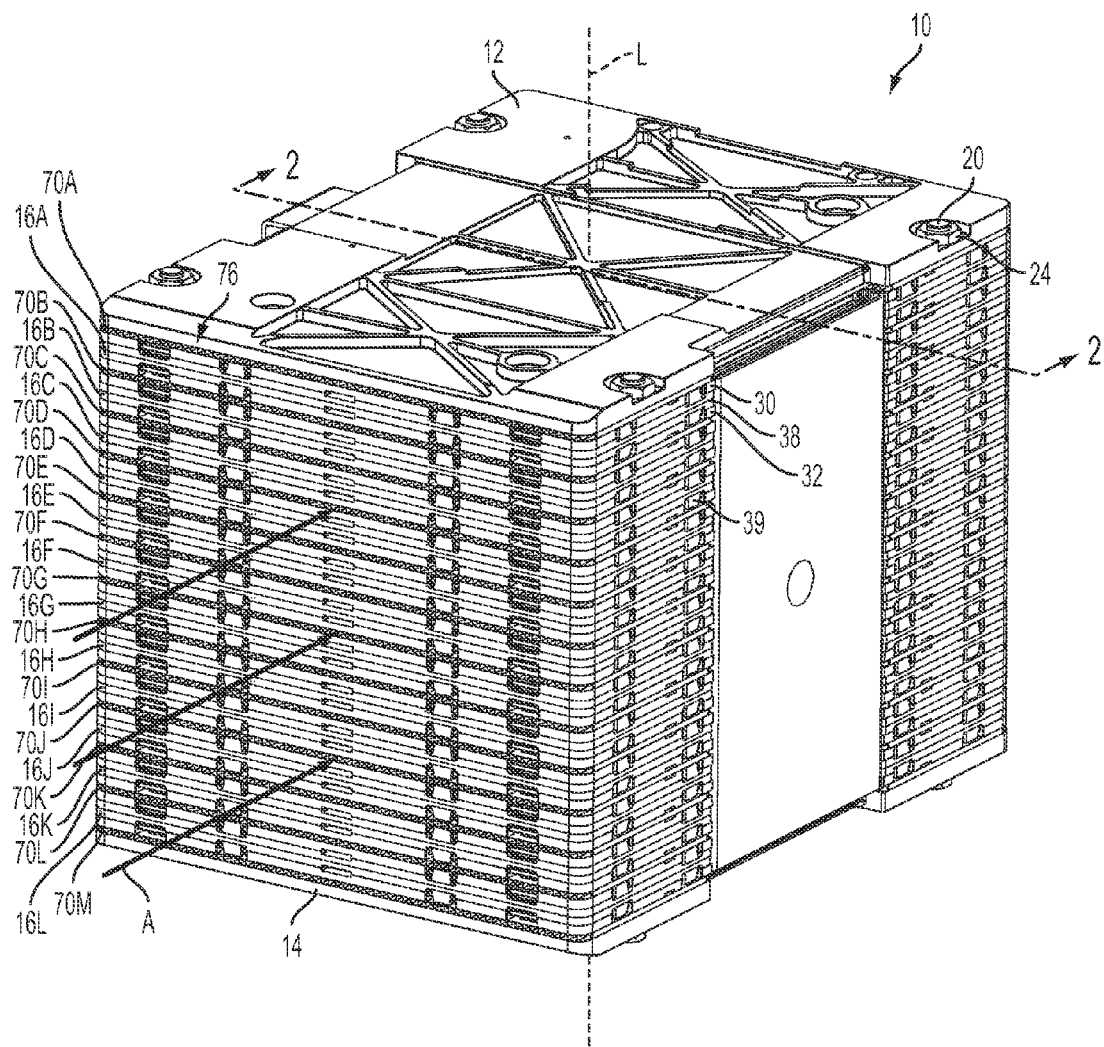
FIG. 1 is a perspective view of an exemplary battery system of the present disclosure, the battery system including a plurality of battery sub-assemblies and a plurality of heat exchange members.
Figure 2:
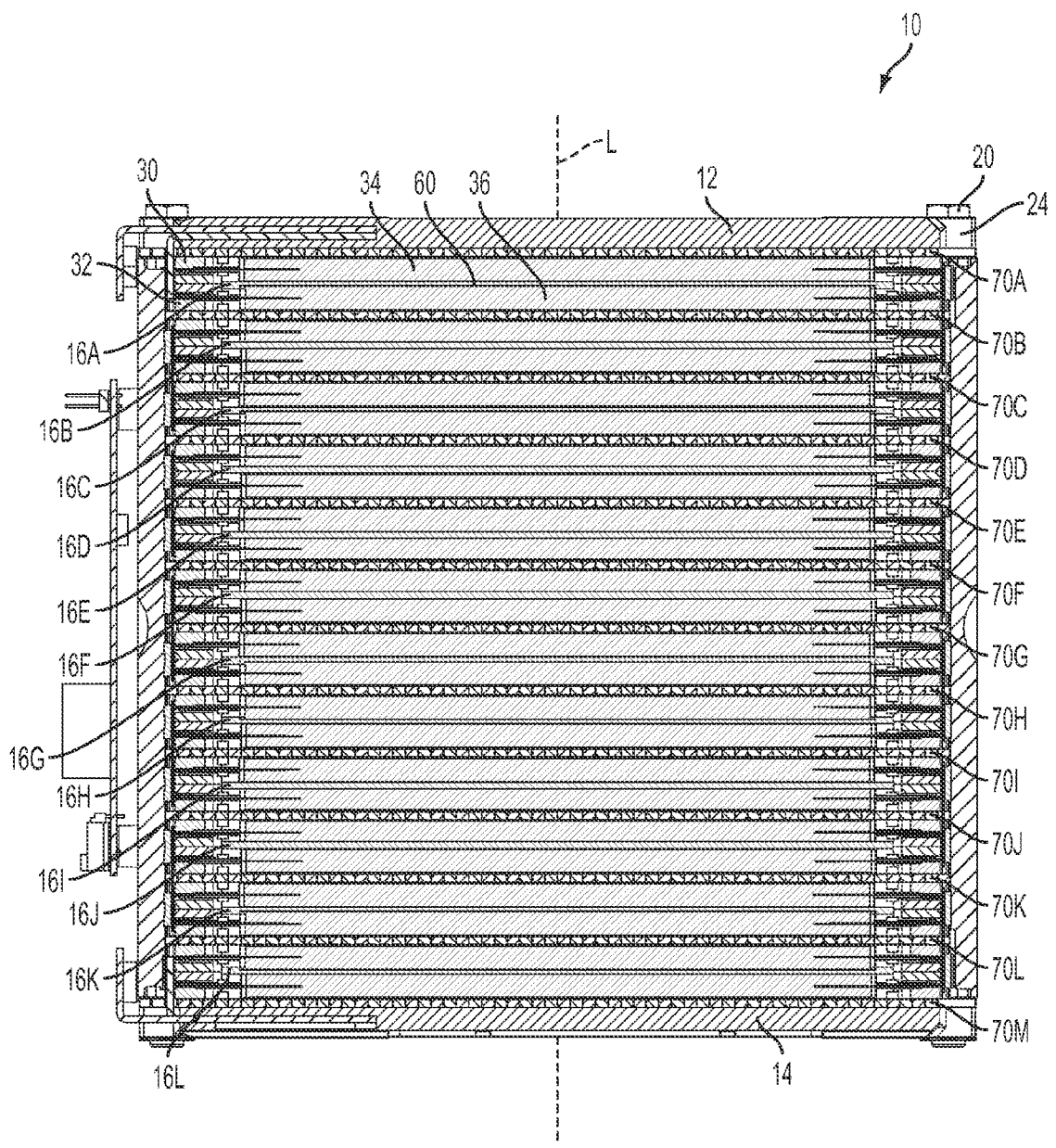
FIG. 2 is a cross-sectional view of the battery system of FIG. 1, taken along line 2-2 of FIG. 1.

An exemplary multi-cell battery system 10 is shown in FIGS. 1 and 2. Battery system 10 may include a plurality of secondary (rechargeable) or non-rechargeable battery cells, as discussed further below. Battery system 10 may be used in a hybrid vehicle or an electric vehicle (e.g., a car, a bus), for example, serving as a power source that drives an electric motor of the vehicle. Battery system 10 may also store and provide energy to other devices which receive power from batteries, such as the stationary energy storage market. Exemplary applications for the stationary energy storage market include providing power to a power grid, providing power as an uninterrupted power supply, and other loads which may utilize a stationary power source. In one embodiment, battery system 10 may be implemented to provide an uninterrupted power supply for computing devices and other equipment in data centers. A controller of the data center or other load may switch from a main power source to an energy storage system of the present disclosure based on one or more characteristics of the power being received from the main power source or a lack of sufficient power from the main power source.

The illustrative battery system 10 of FIGS. 1 and 2 includes a first end support 12, a second end support 14 opposite the first end support 12, and at least one battery sub-assembly positioned between the first and second end supports 12, 14, illustratively twelve battery sub-assemblies 16A-16L. Battery system 10 also includes a positive terminal (not shown) and a negative terminal (not shown) for charging and discharging battery system 10. Battery system 10 further includes at least one support 20 that holds first and second end supports 12, 14 and battery sub-assemblies 16A-16L together. Battery system 10 still further includes at least one heat exchange member positioned between the first and second end supports 12, 14, illustratively thirteen heat exchange members 70A-70M. Individual components of the battery system 10 are described further below.

First and second end supports 12, 14, of battery system 10 are arranged at opposite ends of the battery system 10 to protect and hold together the battery sub-assemblies 16A-16L positioned therebetween, as shown in FIGS. 1 and 2. First and second end supports 12, 14, are illustratively rectangular in shape, although the shape may vary. First and second end supports 12, 14, may be constructed of plastic or another suitable non-conductive material. Although not illustrated in FIGS. 1 and 2, each end support 12, 14, may include a mounting structure for mounting the battery system 10 in place. If, for example, the battery system 10 will be used to power a vehicle, each end support 12, 14, may include one or more rails (not shown) or other suitable mounting brackets for mounting the battery system 10 to the chassis of the vehicle.

Battery sub-assemblies 16A-16L of battery system 10 are stacked together along a longitudinal axis L of battery system 10. Each battery sub-assembly 16A-16L is generally rectangular in shape, although the shape may vary. Each individual battery sub-assembly 16A-16L (i.e., the plane containing each individual battery sub-assembly 16A-16L) is oriented in a direction generally perpendicular to the longitudinal axis L, as shown in FIGS. 1 and 2, with adjacent battery sub-assemblies 16A-16L being oriented generally parallel to one another. Although twelve battery sub-assemblies 16A-16L are shown in FIGS. 1 and 2, the number of battery sub-assemblies in battery system 10 may vary depending on the desired application.

Supports 20 of battery system 10 illustratively include internal tie rods. First and second end supports 12, 14, and battery sub-assemblies 16A-16L cooperate to define internal channels 22 (FIG. 3) for receiving tie rods 20 through battery system 10. As shown in FIG. 1, tie rods 20 are located in each corner of battery system 10 and extend generally parallel to longitudinal axis L of battery system 10. When nuts 24 are tightened onto the threaded ends of each tie rod 20, battery sub-assemblies 16A-16L may become compressed together between the first and second end supports 12, 14 along longitudinal axis L. Other suitable supports include external bands, for example, that are wrapped and secured around battery system 10.

Figure 3:
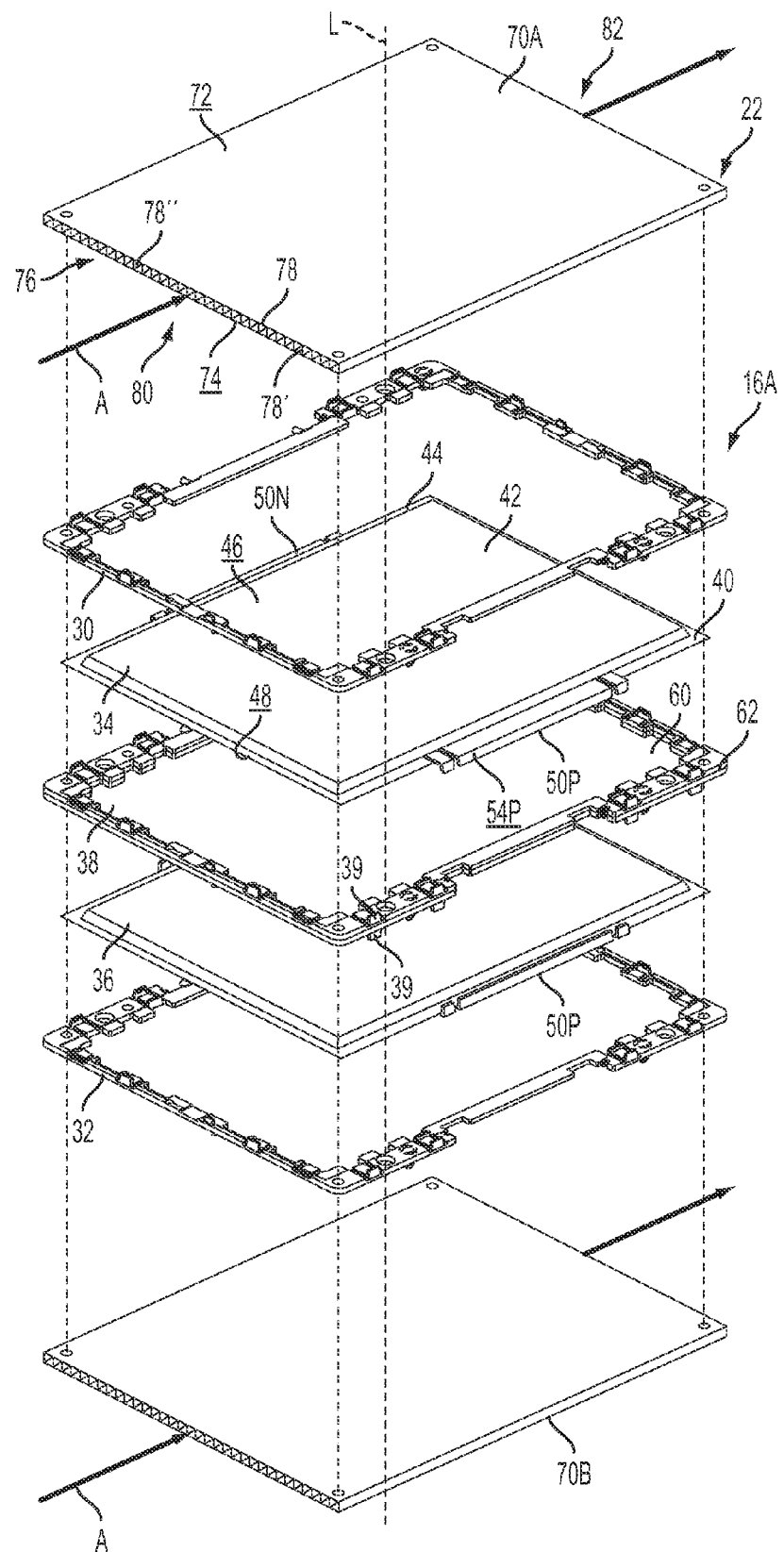
FIG. 3 is an exploded perspective view of a battery sub-assembly of FIG. 1 shown between adjacent heat exchange members.

An individual battery sub-assembly 16A of battery system 10 is shown in more detail in FIG. 3. Battery sub-assembly 16A illustratively includes a first frame 30 (i.e., an upper frame in FIG. 3) and a second frame 32 (i.e., a lower frame in FIG. 3). First and second frames 30, 32, are illustratively rectangular and planar in shape and ring-shaped such that first and second frames 30, 32, are hollow in the middle, although this shape may vary. First and second frames 30, 32, may be constructed of plastic or another suitable non-conductive material.

When assembled, first frame 30 cooperates with second frame 32 to receive one or more battery cells therebetween, illustratively a first battery cell 34 (i.e., an upper battery cell in FIG. 3) and a second battery cell 36 (i.e., a lower battery cell in FIG. 3). In this arrangement, battery cells 34, 36, are sandwiched together between corresponding first and second frames 30, 32. The battery sub-assembly 16A of FIG. 3 includes two battery cells 34, 36, but this number may vary. As shown in FIG. 3, each generally rectangular frame 30, 32 (i.e., the plane containing each individual frame 30, 32) and each generally rectangular battery cell 34, 36 (i.e., the plane containing each individual battery cell 34, 36) is oriented in a direction generally perpendicular to the longitudinal axis L.

Each individual battery sub-assembly 16A may optionally include a framed spacer assembly 38 between first and second battery cells 34, 36, as shown in FIG. 3. In this embodiment, first and second frames 30, 32, may be indirectly coupled together via the framed spacer assembly 38, with each frame 30, 32 being coupled to an opposing side of the framed spacer assembly 38. In other embodiments, the framed spacer assembly 38 is not included between first and second battery cells 34, 36. In these embodiments, first and second frames 30, 32, may be directly coupled together. First and second frames 30, 32, and the framed spacer assembly 38, if included, may be snapped, screwed, welded, adhered, or otherwise coupled together. In the illustrated embodiment of FIG. 3, snap arms 39 extend from both sides of the framed spacer assembly 38 around the periphery of the framed spacer assembly 38 to engage first and second frames 30, 32.

The optional framed spacer assembly 38, if included, may comprise a spacer 60 and a frame 62 surrounding the spacer 60 to mechanically interact with first and second frames 30, 32. In the illustrated embodiment of FIG. 3, the above-described snap arms 39 extend from frame 62 of the framed spacer assembly 38 to mechanically interact with first and second frames 30, 32. An exemplary spacer 60 comprises a sheet of elemental foam. When battery sub-assembly 16A is assembled, the elemental foam spacer 60 may cushion and stabilize the adjacent first and second battery cells 34, 36. The elemental foam spacer 60 may also be compressed between the adjacent first and second battery cells 34, 36.

Each individual battery sub-assembly 16A may be pre-assembled around corresponding battery cells 34, 36, before being distributed commercially. In this manner, each battery sub-assembly 16A may form an independent, self-contained, modular unit of battery system 10. The pre-assembled nature of each battery sub-assembly 16A may facilitate the transportation, storage, and purchasing of individual battery sub-assemblies 16A and the subsequent assembly of battery sub-assemblies 16A-16L to form battery system 10. For example, a customer may order battery sub-assemblies 16A-16L, store the battery sub-assemblies 16A-16L, and then assemble a desired number of the battery sub-assemblies 16A-16L in a desired arrangement to produce a custom battery system 10 having a desired voltage and capacity. The pre-assembled nature of each battery sub-assembly 16A may also protect battery cells 34, 36, from damage caused by the environment or human tampering, for example. The customer may also disassemble battery system 10 and remove and replace an individual battery sub-assembly 16A, if necessary.

Referring still to FIG. 3, exemplary battery cells 34, 36, for use in battery system 10 include prismatic, lithium-ion cells, for example. Battery cells 34, 36, may be relatively soft and compliant. Battery cells 34, 36, are illustratively rectangular and planar in shape, although this shape may vary. Each battery cell 34, 36, may include a plurality of anodes and cathodes stacked together with an electrolyte inside an insulating envelope or package 40. Package 40 may be constructed of a polymer-coated aluminum foil or another suitable material, for example. Each package 40 of FIG. 3 illustratively includes an inner body portion 42, an outer sealed portion 44 surrounding the inner body portion 42, a first generally planar surface 46 (i.e., an upper surface in FIG. 3), and a second generally planar surface 48 (i.e., a lower surface in FIG. 3) opposing the first surface 46.

First and second frames 30, 32, and the optional framed spacer assembly 38, if included, may clamp onto the outer sealed portion 44 of battery cells 34, 36, in a manner that surrounds and frames the inner body portion 42 of battery cells 34, 36. If first and second frames 30, 32, are ring-shaped or hollow in the middle, as shown in FIG. 3, the inner body portion 42 of each battery cell 34, 36, may be exposed. More specifically, first surface 46 of first battery cell 34 may be visible through the hollow first frame 30, and second surface 48 of second battery cell 36 may be visible through the hollow second frame 32.

Referring still to FIG. 3, each battery cell 34, 36, further includes a positive terminal 50P and a negative terminal 50N that communicate electrically with the electrical components inside of package 40. In FIG. 3, positive and negative terminals 50P, 50N, extend from opposite sides of package 40, but it is also within the scope of the present disclosure that positive and negative terminals 50P, 50N, may extend from the same side of package 40. Also in FIG. 3, positive and negative terminals 50P, 50N, are bent by 90 degrees relative to battery cells 34, 36, to form positive and negative coupling surfaces 54P, 54N (FIG. 4), respectively.

Battery cells 34, 36, of each individual battery sub-assembly 16A and/or adjacent battery sub-assemblies 16A-16L may be electrically connected in parallel or series. For example, battery cells 34, 36, of each individual battery sub-assembly 16A may be electrically connected in parallel, and adjacent battery sub-assemblies 16A-16L may be electrically connected in series. This electrical arrangement may be achieved by rotating select battery sub-assemblies (e.g., every other battery sub-assembly 16B, 16D, 16F, 16H, 16J, 16L) by 180 degrees around the longitudinal axis L relative to the other battery sub-assemblies (e.g., the other battery sub-assemblies 16A, 16C, 16E, 16G, 16I, 16K). However, the electrical arrangement of each battery sub-assembly 16A and/or adjacent battery sub-assemblies 16A-16L may vary to produce a battery system 10 having a desired voltage and capacity. Suitable electrical arrangements for battery system 10 are described in U.S. Patent Application Publication No. 2012/0231318 to Buck et al., the disclosure of which is expressly incorporated herein by reference in its entirety. Ultimately, battery sub-assemblies 16A-16L may be electrically coupled to the positive and negative terminals (not shown) of battery system 10 to charge and discharge battery cells 34, 36.

Figure 4:
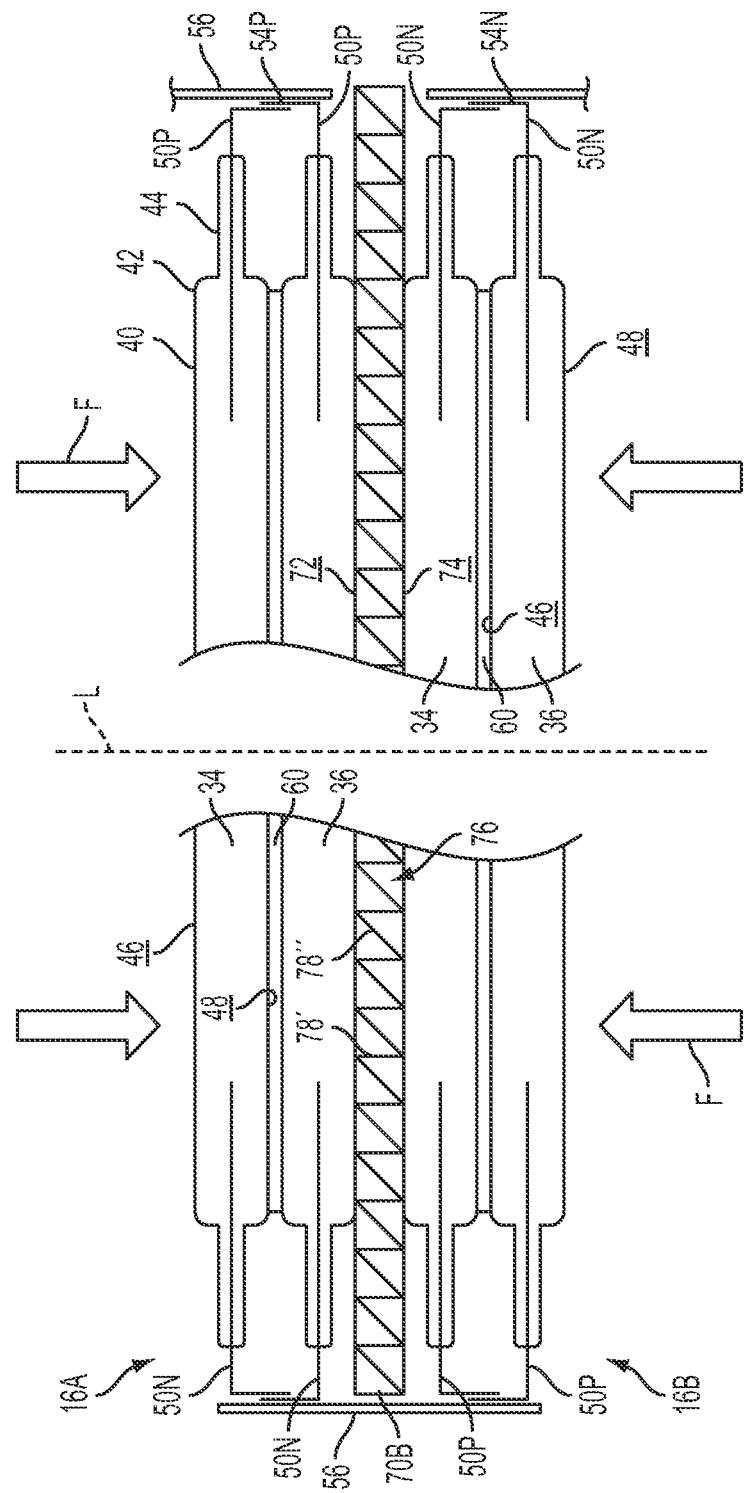
FIG. 4 is a schematic elevational view of a heat exchange member of FIG. 1 shown between adjacent battery sub-assemblies.

Referring next to FIG. 4, two adjacent battery sub-assemblies 16A-16B are shown to illustrate parallel electrical connections within each individual battery sub-assembly 16A, for example, and series electrical connections between the adjacent battery sub-assemblies 16A-16B. As discussed above, the illustrated electrical arrangement may vary. Frames 30, 32, 62, of battery sub-assemblies 16A-16B have been removed in FIG. 4 to better illustrate interactions between the components inside of frames 30, 32, 62 (e.g., battery cells 34, 36, and spacer 60).

In the illustrated embodiment of FIG. 4, the parallel electrical connection between battery cells 34, 36, of battery sub-assembly 16A, for example, is achieved by physically overlapping and mechanically clamping together corresponding positive terminals 50P and corresponding negative terminals 50N of battery cells 34, 36, with electrical connectors 56. In FIG. 4, the physical overlap occurs between positive coupling surfaces 54P of corresponding positive terminals 50P and between negative coupling surfaces 54N of corresponding negative terminals 50N. Electrical connectors 56 may be constructed of an electrically conductive material. Electrical connectors 56 may be removably coupled to battery sub-assembly 16A using suitable mechanical fasteners (not shown), such as studs and nuts, for example. When assembled, as shown in FIG. 4, each electrical connector 56 may be mechanically tightened against the underlying terminals 50P, 50N, of battery cells 34, 36. Electrical connectors 56 may have a crowned or bowed configuration to apply a uniform pressure to the underlying terminals 50P, 50N, respectively.

In the same illustrated embodiment of FIG. 4, the series electrical connection between adjacent battery sub-assemblies 16A-16B is also achieved with electrical connectors 56, which may also be referred to as bus bars or jumper tabs, for example. The illustrative electrical connectors 56 of FIG. 4 are configured to electrically connect two adjacent battery sub-assemblies 16A-16B, but it is also within the scope of the present disclosure that electrical connectors 56 may be configured to connect three or more adjacent battery sub-assemblies (e.g., battery sub-assemblies 16A-16C of FIG. 1).

Returning to FIGS. 1 and 2, heat exchange members 70A-70M of battery system 10 are stacked together along the longitudinal axis L of battery system 10 to flank battery sub-assemblies 16A-16L, including the end-most battery sub-assemblies 16A, 16L, located closest to first and second end supports 12, 14, respectively. Each individual heat exchange member 70A-70M (i.e., the plane containing each individual heat exchange member 70A-70M) is oriented in a direction generally perpendicular to the longitudinal axis L, with adjacent heat exchange members 70A-70M being oriented generally parallel to one another and generally parallel to battery sub-assemblies 16A-16L. Although thirteen heat exchange members 70A-70M are shown in FIGS. 1 and 2, the number of heat exchange members in battery system 10 may vary depending on the desired application.

Two heat exchange members 70A, 70B, of battery system 10 are shown in more detail in FIG. 3. The illustrative heat exchange members 70A, 70B, are generally rectangular in shape to match the size and shape of battery sub-assembly 16A located therebetween, although this shape may vary. Each illustrative heat exchange member 70A, 70B, includes a first generally planar surface 72 (i.e., an upper surface in FIG. 3), and a second generally planar surface 74 (i.e., a lower surface in FIG. 3) opposite the first surface 72. Between first and second surfaces 72, 74, each heat exchange member 70A, 70B, is generally hollow to define a heat exchange pathway or conduit 76 therebetween. A plurality of spaced-apart struts 78 between first and second surfaces 72, 74, may extend in parallel along the length of conduit 76 to support and stabilize first and second surfaces 72, 74, without blocking conduit 76. In this manner, conduit 76 may be defined between first and second surfaces 72, 74, and between adjacent struts 78. The illustrative heat exchange members 70A, 70B, include straight struts 78' and angled struts 78". The shape, arrangement, and number of struts 78 in each heat exchange member 70A, 70B, may vary.

Heat exchange members 70A, 70B, may be constructed of plastic, metal, or another suitable material. An exemplary material comprises a sheet of corrugated plastic, such as Formex® GK sheets available from ITW Formex® of Addison, Ill. Advantageously, corrugated plastic sheets are hollow, lightweight, strong, and inexpensive. An exemplary plastic material includes polypropylene, for example.

Referring again to FIG. 4, heat exchange member 70B is shown sandwiched between two adjacent battery sub-assemblies 16A-16B. As noted above, frames 30, 32, 62, of battery sub-assemblies 16A-16B have been removed in FIG. 4 to better illustrate interactions between battery cells 34, 36, of battery sub-assemblies 16A-16B and the intermediate heat exchange member 70B.

According to an exemplary embodiment of the present disclosure, heat exchange member 70B makes direct contact with packages 40 of the adjacent battery cells 34, 36, and more specifically with inner body portions 42 of packages 40 of the adjacent battery cells 34, 36. In the illustrated embodiment of FIG. 4, for example, the first or upper surface 72 of heat exchange member 70B makes direct contact with the second or lower surface 48 of the adjacent second battery cell 36 from the first battery sub-assembly 16A, and the second or lower surface 74 of heat exchange member 70B makes direct contact with the first or upper surface 46 of the adjacent first battery cell 34 from the second battery sub-assembly 16B. Although frames 30, 32, around battery cells 34, 36, are not shown in FIG. 4, the ring-shaped frames 30, 32, shown in FIG. 3 may facilitate this direct contact by exposing inner body portions 42 of battery cells 34, 36, of battery sub-assemblies 16A-16B to the intermediate heat exchange member 70B. It is also within the scope of the present disclosure that heat exchange member 70B may nest within the ring-shaped frames 30, 32, to directly contact inner body portions 42 of battery cells 34, 36. This direct contact between battery cells 34, 36, of battery sub-assemblies 16A-16B and the intermediate heat exchange member 70B may promote heat exchange between battery cells 34, 36, and the intermediate heat exchange member 70B, as discussed further below.

According to another exemplary embodiment of the present disclosure, the planar first and second surfaces 72, 74, of heat exchange member 70B that contact battery cells 34, 36, are generally smooth (i.e., flat) and continuous (i.e., solid). When battery sub-assemblies 16A, 16B, and heat exchange member 70B are compressed together along longitudinal axis L by compression forces F (e.g., compression forces from first and second end supports 12, 14, of FIG. 1 and/or external compression forces), the smooth and continuous first and second surfaces 72, 74, of heat exchange member 70B may distribute the compression forces F evenly across battery cells 34, 36. If first and second surfaces 72, 74, of heat exchange member 70B included gaps, openings, or other irregularities, by contrast, heat exchange member 70B may distribute the compression forces F unevenly across battery cells 34, 36, which could cause battery cells 34, 36, to bend or deform, develop internal shorts, and/or suffer performance losses, for example. The compression forces F may promote the ionic conductivity of battery cells 34, 36. The compression forces F on battery cells 34, 36, may be about 3 psi, 5 psi, 7 psi, or more, for example.

According to yet another exemplary embodiment of the present disclosure, each battery cell 34, 36, in battery system 10 may border at least one heat exchange member 70A-70M for heat exchange. For example, as shown in FIG. 1, battery cells 34, 36, in battery sub-assembly 16A may border heat exchange members 70A, 70B, respectively; battery cells 34, 36, in battery sub-assembly 16B may border heat exchange members 70B, 70C, respectively; and so on.

In use, a heat exchange medium (e.g., air, water) travels through conduits 76 of heat exchange members 70A-70M, as shown in FIG. 1. Heat from battery cells 34, 36, of each battery sub-assembly 16A-16L travels along a short path through the walls of packages 40 and into the adjacent heat exchange members 70A-70M to be carried away by the heat exchange medium in conduits 76 by convection. In one embodiment, ambient air may be allowed to freely enter and exit conduits 76 of heat exchange members 70A-70M. In another embodiment, air may be directed or forced through conduits 76 of heat exchange members 70A-70M. For example, a cool heat exchange medium may be directed into inlet 80 of each conduit 76 from an inlet duct (not shown), and after heat exchange, a warm heat exchange medium may be directed out of outlet 82 of each conduit 76 through an outlet duct (not shown).

In the illustrated embodiment of FIG. 1, the heat exchange medium travels through conduits 76 in the direction of arrows A. The direction A is illustratively transverse, and more specifically perpendicular, to the longitudinal axis L of battery system 10. Also, the direction A is illustratively parallel to the first and second end supports 12, 14, parallel to the battery sub-assemblies 16A-16L, and the battery cells 34, 36, contained therein (FIG. 3), and parallel to the heat exchange members 70A-70M.

To encourage the heat exchange medium to travel through conduits 76 of heat exchange members 70A-70M, the heat exchange medium may be pushed and/or pulled through conduits 76 by a suitable fan or pump, for example. Also, the inlet duct (not shown) that is coupled to inlet 80 of conduits 76 may converge or narrow as it moves toward battery system 10, while the outlet duct (not shown) that is coupled to outlet 82 of conduits 76 may diverge or widen as it moves away from battery system 10.

The thickness of heat exchange members 70A-70M (i.e., the distance between first and second surfaces 72, 74, of heat exchange members 70A-70M) may be selected to control the size of conduits 76. For example, heat exchange members 70A-70M may by about 1 mm thick, 2 mm thick, 3 mm thick, or more. Controlling the size of conduits 76 allows one to control and balance the amount of heat exchange medium that may be directed through conduits 76.

Temperature sensors (e.g., thermistors) may be provided throughout battery system 10 to control the flow of the heat exchange medium and to regulate the cooling of battery system 10. In one embodiment, the thermistors are positioned in or near one or more conduits 76 of heat exchange members 70A-70M.

The heat exchange members 70A-70M and cooling methods disclosed herein may share various features in common with the compliant heat exchange assemblies and cooling methods disclosed in a U.S. provisional patent application Ser. No. 61/783,182, entitled BATTERY SYSTEM WITH COMPLIANT HEATSINK ASSEMBLY, filed on the same day as the present application, the disclosure of which is expressly incorporated herein by reference in its entirety.

EXAMPLE

The following example illustrates a method for evaluating cooling of a battery system of the present disclosure.

A prototype battery system similar to battery system 10 of FIG. 1 was subjected to Finite Element Analysis (FEA) to simulate operating the battery system in 40° C. ambient air at 7.6 watts per cell continuous. Based on the FEA test results, the prototype battery system only increased in temperature by about 7-8° C.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A battery system comprising:
   a plurality of compliant battery cells including:
      a first cell having a first outer sealed portion, a first inner body portion, and a first terminal extending from the first cell; and
      a second cell having a second outer sealed portion, a second inner body portion, and a second terminal extending from the second cell;
   a first frame having an outer portion defining first and second sides and a hollow center portion, the outer portion supporting the first outer sealed portion of the first cell by abutting the first outer sealed portion of the first cell with the first side of the outer portion of the first frame and remaining spaced apart from the second side of the outer portion of the first frame, and the hollow center portion exposing the first inner body portion of the first cell; and
a heat exchange member located between the first and second cells, the heat exchange member including:
a first planar surface in direct contact with the first inner body portion of the first cell and in direct contact with the second side of the outer portion of the first frame, wherein the first inner body portion of the first cell is exposed through the hollow center portion of the first frame for direct contact with the first planar surface of the heat exchange member;
a second surface opposite the first surface; and
a heat exchange passageway formed between the first and second surfaces.

2. The battery system of claim 1, wherein the first surface of the heat exchange member is a continuous surface that makes continuous contact with the first cell.

3. The battery system of claim 1, wherein the second surface of the heat exchange member is a planar surface that is in direct contact with the second cell.

4. The battery system of claim 3, wherein the second surface of the heat exchange member is a continuous surface that makes continuous contact with the second cell.

5. The battery system of claim 1, wherein the second cell is arranged longitudinally of the heat exchange member along a longitudinal axis, and the heat exchange member is arranged longitudinally of the first cell along the longitudinal axis.

6. The battery system of claim 5, wherein the heat exchange passageway of the heat exchange member is oriented perpendicular to the longitudinal axis.

7. The battery system of claim 1, wherein the heat exchange passageway of the heat exchange member is oriented parallel to the first and second cells.

8. The battery system of claim 1, wherein the heat exchange member includes a plurality of spaced-apart struts between the first and second surfaces.

9. The battery system of claim 8, wherein the plurality of struts are arranged in parallel to one another.

10. The battery system of claim 1, wherein the first terminal of the first cell is electrically coupled to the second terminal of the second cell.

11. The battery system of claim 1, further comprising:
a third cell having a third terminal extending from the third cell, the first and third cells arranged together in a first framed sub-assembly including the first frame with the first terminal of the first cell contacting the third terminal of the third cell; and
a fourth cell having a fourth terminal extending from the fourth cell, the second and fourth cells arranged together in a second framed sub-assembly with the second terminal of the second cell contacting the fourth terminal of the fourth cell.

12. A battery system comprising:
a frame including an outer portion and a hollow center portion, the frame further including a first side, a second side and an mid-frame axis midway between the first side and the second side;
a plurality of prismatic battery cells including:
a first cell having an outer portion in contact with the first side of the frame and remaining spaced apart from the second side, a first terminal extending from the outer portion, and an inner body portion surrounded by the outer portion, the inner body portion being intersected by the mid-frame axis; and
a second cell having a second terminal extending from the second cell; and
a heat exchange member located between the first and second cells, the heat exchange member including:
a first planar surface compressed against the inner portion of the first cell and compressed against the second side of the frame, wherein the inner body portion of the first cell is exposed through the hollow center portion of the frame for direct contact with the first planar surface of the heat exchange member;
a second planar surface opposite the first surface;
a plurality of spaced-apart struts between the first and second surfaces; and
a heat exchange passageway formed between the first and second surfaces and the plurality of struts, the frame being positioned between the outer portion of the first cell and the second planar surface of the heat exchange member.

13. The battery system of claim 12, wherein the second surface of the heat exchange member is a planar surface that is compressed against the second cell.

14. The battery system of claim 12, wherein the second cell is arranged longitudinally of the heat exchange member along a longitudinal axis, and the heat exchange member is arranged longitudinally of the first cell along the longitudinal axis.

15. The battery system of claim 14, further comprising a first end support and a second support that compress the heat exchange member between the first and second cells along the longitudinal axis.

16. The battery system of claim 12, wherein the frame is a first ring-shaped frame around an outer sealed portion of the first cell, wherein the inner body portion of the first cell is exposed through the first ring-shaped frame to contact the first planar surface of the heat exchange member.

17. The battery system of claim 12, wherein the heat exchange member comprises a corrugated plastic sheet.

18. A method of assembling a battery system, the battery system including a plurality of prismatic battery cells including a first prismatic cell having a first end and a second end and a second prismatic cell having a first end and a second end, the method comprising the steps of:
arranging a heat exchange member between the first and second cells, the heat exchange member including:
a first plastic planar surface;
a second plastic planar surface opposite the first surface; and
a heat exchange passageway formed between the first plastic planar surface and the second plastic planar surface; and
arranging the heat exchange member between the first prismatic cell and the second prismatic cell so that an inner portion of the first plastic planar surface of the heat exchange member is in direct contact with a generally planar surface of the first prismatic cell through a hollow center portion of a frame, an outer portion of the first plastic planar surface of the heat exchange member is in contact with an outer portion of the frame, and the second plastic planar surface of the heat exchange member is in direct contact with a generally planar surface of the second prismatic cell, wherein the heat exchange member is oriented to cause the heat exchange passageway to extend beyond the first and second ends of the first and second prismatic cells.

19. The method of claim 18, further comprising the step of passing a heat exchange medium through the heat exchange passageway to cool the first and second cells.

20. The method of claim 18, further comprising the step of arranging a second heat exchange member parallel to the heat exchange member.

21. The method of claim 20, further comprising the step of compressing the second heat exchange member between a third cell and a fourth cell.

22. The method of claim 21, further comprising the step of arranging the second and third cells between the heat exchange member and the second heat exchange member.

23. The method of claim 21, further comprising the steps of:
electrically coupling the first and second cells together in series;
electrically coupling the second and third cells together in parallel; and
electrically coupling the third and fourth cells together in series.

24. The battery assembly of claim 1, wherein the first frame surrounds the inner body portion of the first cell, the first frame being positioned between the outer portion of the first cell and the first planar surface of the heat exchange member.

25. The battery assembly of claim 1, wherein the first frame is positioned between the outer portion of the first cell and the first planar surface of the heat exchange member.

26. The battery assembly of claim 25, wherein the inner body portion of the first cell is thicker than the outer portion of the first cell, the inner body portion of the first cell extending into the hollow center portion of the first frame.

27. The battery system of claim 1, further comprising:
a second frame having an outer portion defining first and second sides and a hollow center portion, the outer portion of the second frame supporting the first outer sealed portion of the first cell by abutting the first outer sealed portion of the first cell with the second side of the outer portion of the second frame and remaining spaced apart from the first side of the outer portion of the second frame;
a spacer supported within the hollow center portion of the second frame, at least a portion of the spacer abutting the first inner body portion of the first cell;
a third frame having an outer portion defining a first and second sides and a hollow center portion;
a third cell having a third outer sealed portion and a third inner body portion, the third cell positioned intermediate the first side of the second frame and the second side of the third frame, the outer portion of the third frame supporting the third outer sealed portion of the third cell by abutting the third outer sealed portion of the third cell with the second side of the third frame and remaining spaced apart from the first side of the outer portion of the third frame; and
a second heat exchange member positioned adjacent the first side of the outer portion of the third frame, the second heat exchange member including:
a first planar surface in direct contact with the third inner body portion of the third cell and in direct contact with the first side of the outer portion of the first frame;
a second planar surface opposite the first planar surface; and
a heat exchange passageway formed between the first and second planar surfaces,
wherein the second heat exchange member is arranged longitudinally of the third frame along a longitudinal axis, the third frame is arranged longitudinally of the third cell along the longitudinal axis, the third cell is arranged longitudinally of the second frame along the longitudinal axis, the second frame is arranged longitudinally of the first cell along the longitudinal axis, the first cell is arranged longitudinally of the first frame along the longitudinal axis, the first frame is arranged longitudinally of the first heat exchange member along the longitudinal axis, and the first heat exchange member is arranged longitudinally of the second cell, and
wherein each of the first frame, the second frame, the third frame, the first heat exchange member, and the second heat exchange member include a respective aperture extending along the longitudinal axis, each of the respective apertures is configured to receive a tie-rod, the tie-rod extending along the longitudinal axis when received within each of the respective apertures.

* * * * *